US011865389B2

(12) United States Patent
Jiang et al.

(10) Patent No.: US 11,865,389 B2
(45) Date of Patent: Jan. 9, 2024

(54) VEHICLE-MOUNTED LARGE-FLOW FIRE-FIGHTING FOAM FLUID MIXING SYSTEM

(71) Applicant: China University of Mining and Technology, Xuzhou (CN)

(72) Inventors: Ziyi Jiang, Xuzhou (CN); Wei Li, Xuzhou (CN); Jinsong Zhu, Xuzhou (CN); Fan Jiang, Xuzhou (CN); Ge Zhao, Xuzhou (CN); Xiumei Liu, Xuzhou (CN); Beibei Li, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 741 days.

(21) Appl. No.: 16/975,421

(22) PCT Filed: May 14, 2019

(86) PCT No.: PCT/CN2019/086775
§ 371 (c)(1),
(2) Date: Aug. 25, 2020

(87) PCT Pub. No.: WO2020/077989
PCT Pub. Date: Apr. 23, 2020

(65) Prior Publication Data

US 2021/0346740 A1 Nov. 11, 2021

(30) Foreign Application Priority Data

Oct. 19, 2018 (CN) ........................ 201811219308.X

(51) Int. Cl.
*A62C 5/02* (2006.01)
*A62C 27/00* (2006.01)

(52) U.S. Cl.
CPC .............. *A62C 5/022* (2013.01); *A62C 27/00* (2013.01)

(58) Field of Classification Search
CPC ............ A62C 5/02; A62C 27/00; A62C 5/022
See application file for complete search history.

(56) References Cited

U.S. PATENT DOCUMENTS 3,115,158 A * 12/1963 Sheppard ............... A62C 27/00
137/895
4,278,132 A * 7/1981 Hostetter ................. A62C 5/00
261/DIG. 26

(Continued)

*Primary Examiner* — Umashankar Venkatesan
(74) *Attorney, Agent, or Firm* — PROI Intellectual Property US; Klaus Michael Schmid

(57) ABSTRACT

The present invention discloses a vehicle-mounted large-flow fire-fighting foam fluid mixing system, including a supply kit, a mixing kit, a control kit, and a pipeline kit. The supply kit includes an auxiliary gas supply device, a fire pump, an integrated foam pump, a fire pump main motor, and a coupling. The mixing kit includes a fire monitor interface, a foam generating device, and a fluid mixing device. The control kit includes a foam mixing proportion single-chip microcomputer control system, an alarm module, a power module, an auxiliary air compressor switch module, a frequency converter, and a central control display screen. The pipeline kit includes an air drainage tube, a fire hose, a foam liquid pipe, and a pipeline valve. For the problems of flow fluctuation and low foam foaming efficiency, the present invention optimizes the design and adopts a new control policy, thereby implementing precise mixing under the large-flow condition.

6 Claims, 3 Drawing Sheets

(56) References Cited

U.S. PATENT DOCUMENTS

| | | | | | |
|---|---|---|---|---|---|
| 4,345,654 | A * | 8/1982 | Carr | B05B 7/24 | 169/14 |
| 4,474,680 | A * | 10/1984 | Kroll | B01F 35/56 | 261/DIG. 26 |
| 4,981,178 | A * | 1/1991 | Bundy | A62C 5/02 | 261/DIG. 26 |
| 5,145,014 | A * | 9/1992 | Eberhardt | A62C 27/00 | 261/DIG. 26 |
| 5,398,765 | A * | 3/1995 | Worthington | A62C 5/02 | 261/DIG. 26 |
| 6,733,004 | B2 * | 5/2004 | Crawley | B01F 35/2211 | 169/44 |
| 2009/0288845 | A1 * | 11/2009 | Belford | A62C 5/02 | 169/15 |
| 2010/0193201 | A1 * | 8/2010 | Zeller | A62C 99/0036 | 169/46 |
| 2013/0048318 | A1 * | 2/2013 | Ewers | A62C 31/12 | 169/46 |
| 2014/0352985 | A1 * | 12/2014 | McLoughlin | A62C 5/022 | 169/13 |
| 2015/0283523 | A1 * | 10/2015 | Clausen | B01F 23/2323 | 261/50.3 |
| 2018/0126203 | A1 * | 5/2018 | Beluse | B05B 12/1436 | |
| 2022/0072351 | A1 * | 3/2022 | Jungmair | A62C 5/02 | |
| 2022/0290667 | A1 * | 9/2022 | Fancote | A62C 25/00 | |

* cited by examiner

VEHICLE-MOUNTED LARGE-FLOW FIRE-FIGHTING FOAM FLUID MIXING SYSTEM

BACKGROUND

Technical Field

The present invention relates to a vehicle-mounted foam fire-fighting system, and in particular, to a vehicle-mounted large-flow fire-fighting foam fluid mixing system providing stable fire extinguishing jet with large flow and large coverage area.

Related Art

A fire-fighting foam system is also referred to as a submerged foam covering fire extinguishing system, which means that: water and foam liquid are fully mixed to form a foamed foam mixture in a foam foaming device, and because the foam mixture is heavier than air and lighter than comburent, the foam mixture is used to cover the surface of comburent to isolate the comburent from the air and reduce the temperature of the comburent, thereby achieving the purpose of retarding flame and extinguishing fire. At present, according to the current national standards, the foam liquid may include several forms according to the foaming expansion, for example, low-expansion foam liquid (less than 20 expansions), medium-expansion foam liquid (21-200 expansions), and high-expansion foam liquid (201-11000 expansions). The foaming expansion of foam liquid is defined as: a ratio of a volume of the foamed foam to a volume of an original mixture. To obtain the foamed foam with a larger volume, when extinguishing fire, fire fighting forces expand the volume of foam by forcing air supply or pumping foam into compressed air, to fill the air evenly and finely in the space inside the foam film, so that the effect of foam on extinguishing fire is significantly improved.

Generally, a foam proportion mixing and generating device is a main device of a foam fire-extinguishing system. The device can mix fire water and a foaming agent in a certain proportion according to design requirements, and the mixing proportion of the fire water and the foaming agent is very critical, which directly determines the foaming expansion of fire-extinguishing foam and the effect of foam on extinguishing fire. The mixture is sent to the foaming device for foaming. The foam proportion mixing device mainly includes a pipeline foam proportion mixing device, a ring pump foam proportion mixing device, a pressure foam proportion mixing device, and a balance pressure foam proportion mixing device. In the current national regulations, it is recommended to use the balance pressure foam proportion mixing device with good system stability and superior fire extinguishing efficiency.

When the existing balanced foam proportion mixing device is in operation, a foam liquid pump pressurizes the foam liquid and then sends the foam liquid to a balance valve, and the balance valve adjusts flow and pressure of the foam liquid injected into a proportional mixer according to pressure and flow of water in a main fire-fighting pipeline where the mixing proportion of the proportional mixer is stable. When the pressure and flow of water in the main fire-fighting pipeline change, the balance valve can dynamically adjust the amount of foam liquid injected into the mixer, to ensure that the foam mixture whose mixing proportion is more precise can be prepared continuously during the operation of the device. Compared with an old foam fire-extinguishing device, the balanced foam proportion mixing device can dynamically adjust, through the balance valve, the amount of foam entering the foam proportional mixer, to ensure the precise mixing proportion at a certain flow. The device equipped with a pressure relief valve or a pressure holding valve can ensure a stable nominal working pressure, which is applicable to most types of foam fire-extinguishing agents. A foam liquid tank is an atmospheric pressure storage tank, and the foam liquid can be added to the storage tank at any time in the process of extinguishing fire. The foam liquid tank can be manually/automatically controlled and the operation is simple and reliable. The foam liquid tank is applicable to large and medium-sized foam fire-extinguishing systems, especially systems in some important places such as petrochemical enterprises, large oil depots, airports, wharves, and offshore drilling platforms. Nowadays, most of fuel supply devices used in urban middle and high rise buildings use pressurized natural gas pipelines or liquefied petroleum gas pipelines, and consequently volatilization, explosion, and spreading fire are prone to occur during a fire. Combining the balanced foam proportion mixing device applied to a fixed fire-fighting platform with a city main battle fire truck can greatly resolve the fire-fighting problem in the urban construction area. In this case, a large-flow remote fire monitor is used to spray fire-extinguishing agents from a long distance to an ignition point, to effectively block a leaking gas pipeline, isolate a fire point, and reduce the temperature, thereby achieving the purpose of extinguishing fire. Certainly, because this type of fire-fighting device is large in volume and high in cost, market share of the device is small. However, the device can meet fire protection demands for a long time in the future, and has a broad application prospect.

Main components of the balanced foam proportion mixing device are: a balanced mixer, a foam pump, a fire pump, an electric control cabinet, a drive motor, a valve, and a prefabricated pipe. The drive motor provides power to the pump, and most systems rely on electric control valves to regulate the flow of various fluids. Key components such as the valve and the mixer have a direct effect on the working performance of the system. When the required amount of water or foam liquid flow increases, the valve and a flow controller on the pipeline will inevitably have flow fluctuations, and a valve core and an inner wall of the mixer need to withstand great vibration and impact under the effect of a water hammer, thus causing a flowmeter to be inaccurate in measurement, interfering with the mixing proportion of the mixture, accelerating the corrosion and wear of the valve core, and affecting the service life of the entire system. The existing techniques for controlling the foam mixing proportion are limited to controlling the mixing proportion and the foaming expansion by reading values of two types of liquid flow and relying on a single parameter PID regulator to generate a control signal. When the fluid flow fluctuates, measurement results of the flowmeter are disturbed, resulting in an increase in the quantity of invalid operations of an operation member and an increase in the invalid stroke of an executive element. In serious cases, this may lead to the deviation of the system from the working range, and the divergence of the control signal may lead to the burning of an electric control component. At present, the mixer rarely introduces external air to increase the foaming expansion, and a small part of key devices required for rapid fire extinguishing uses a method for introducing air by adding a set of air compression equipment to pump high-pressure gas into the mixer. This gas supply method increases the volume and complexity of the entire system, making it difficult to move and maintain the system. In addition, because an air compressor is extremely sensitive to key indicators such as water vapor and humidity during work, to prevent the high-pressure liquid in the pipeline from flowing back into the air compression equipment, a plurality of valves has to be disposed on the pipeline to prevent failures, and the system equipment must follow a strict boot process at startup, thus greatly reducing the damage resistance of the system and man-machine efficiency. In a case of misoperation, the system may fail to work or even be damaged and scrapped. These shortcomings are unacceptable in a fire environment where efficiency and operating time are significant. This requires that the foam mixing system can work stably under the large flow condition with multiple fluctuations and can effectively resolve the inherent problem that the foaming quality of the foam generating device is difficult to be improved.

At present, designs related to the improvement of the balanced foam proportion mixing device are as follows. A utility model patent NO. CN206381514U entitled "FIRE-FIGHTING FOAM PROPORTION MIXER" discloses a method for adjusting foam liquid flow by using high-speed water flow to generate a negative pressure in a variable-section venturi tube. However, the method is limited to adjusting the relationship between two types of liquid flow, and the adjustment of the cross section area of the device depends on the relationship between a preset spring force and a flow pressure. Consequently, the method fails to meet the requirement of precise control. A utility model patent NO. CN206103154U entitled "VERTICAL FIRE-FIGHTING FOAM MIXING MECHANISM" discloses a vertical foam mixing device applicable to situations where volume is limited. However, for the core problems such as flow fluctuation and foaming efficiency, no corresponding modification scheme is proposed. In addition, the storage tank device in vertical state affects the effective operation of the liquid supply pipeline, and the phenomenon of interruption of liquid supply at low liquid level is prone to occur. A utility model patent NO. CN206081383U entitled "FIRE-FIGHTING FOAM PROPORTION MIXING DEVICE" discloses a fire-fighting foam proportion mixing device driven by a motor and having a stirring foaming device. An added mixing device needs to be driven by an additional power source, which further increases the energy consumption, and the pipeline is complicated due to the increase of mechanism, making it difficult to write a valve control policy. A utility model patent NO. CN205145461U entitled "FIRE-FIGHTING FOAM FIRE-EXTINGUISHING SYSTEM FOR JETTING GAS-LIQUID TWO-PHASE JET" discloses a foam injection device relying on an external air compressor to force air supply. However, there are too many valves on the pipeline, the mechanism of the air compressor is complex, and the air compressor requires a large quantity of auxiliary equipment for normal operation. Once the air supply system fails, the entire machine stops operation. In summary, at present, there is no device that can precisely control the proportion mixing process of the fire-fighting foam, and there is no design that can improve the foaming efficiency of the fire-fighting foam.

SUMMARY

The technical problem to be resolved by the present invention is to overcome the defects of the prior art, further accurately control the mixing proportion of the fire extinguishing agent under the condition of large flow, and resolve the problem of low foaming efficiency of the foam mixing device. The present invention provides a large-flow fire-fighting foam fluid mixing system used for vehicle environment. To reduce the complexity of the equipment, reduce the related energy consumption, improve the foaming efficiency of fire extinguishing foam as much as possible within the working range of the equipment, and resolve the problem of low generality in all types of environments, a scheme for real-time regulation of equipment operating conditions based on fuzzy control technology by a single-chip microcomputer is proposed.

To resolve the foregoing technical problems, the vehicle-mounted large-flow fire-fighting foam fluid mixing system provided in the present invention specifically includes a supply kit, a mixing kit, and a pipeline kit. The composition is as follows. The supply kit is a work actuator of the system, the mixing kit is a core device of the system and is configured to generate fire-fighting foam, and the pipeline kit connects the supply kit to the mixing kit as a whole and transports a working medium.

The mixing kit is configured to generate fire-fighting foam that meets fire fighting conditions, and includes a fire monitor interface, a foam generating device, and a fluid mixing device. The fire monitor interface is fixed at a fluid outlet end of the foam generating device through a flange. The fluid mixing device is fixedly connected to a fluid inlet end of the foam generating device through a threaded pipe.

The supply kit is configured to provide a fluid medium required for the work of the system, and includes an auxiliary gas supply device, a fire pump, an integrated foam pump, a fire pump main motor, and a coupling. The fire pump main motor is connected to the fire pump through the coupling, and provides rotating momentum to the fire pump. The integrated foam pump includes two parts: a foam pump motor and a pump group, and foam liquid is injected into water flow at a certain pressure at a place where pressure is lowered in a fire water elbow through the device to complete mixing of the two types of liquid. The fire pump and the integrated foam pump are respectively connected to the fluid mixing device. The auxiliary gas supply device is fixedly connected to an intake end of the foam generating device.

Preferably, the system further includes a control kit. The control kit is equipped with a control policy program, and is configured to monitor the working state of the system, implement human-computer interactions, and issue control instructions. During operation, the control kit samples characteristic values such as flow pressure in the working state of the mixing kit in real time, analyzes whether the working state of the system reaches the standard according to a control policy, automatically adjusts a power frequency setting value of each motor in the supply kit according to a deviation calculated from an analysis result, and adjusts the flow and pressure of the working medium, thus causing the working state of the mixing kit to reach an ideal value, and implementing the intelligent fire extinguishing operation.

The control kit includes a foam mixing proportion single-chip microcomputer control system, an alarm module, a power module, an auxiliary air compressor switch module, a frequency converter, a central control display screen, an auxiliary air flow pressure monitoring instrument, a fire water flow pressure monitoring instrument, and a foam liquid flow pressure monitoring instrument. The fire water flow pressure monitoring instrument is disposed between the fire pump and the fluid mixing device, and the foam liquid flow pressure monitoring instrument is disposed between the integrated foam pump and the fluid mixing device. The alarm module, the power module, the auxiliary air compressor switch module, the frequency converter, and the central control display screen are respectively connected to the foam mixing proportion single-chip microcomputer control system. The foam mixing proportion single-chip microcomputer control system is provided with a data acquisition module. The data acquisition module is connected to the fire water flow pressure monitoring instrument, the foam liquid flow pressure monitoring instrument, and the auxiliary air flow pressure monitoring instrument respectively, and is configured to process acquired data in combination with a pre-installed program and send a control signal to the frequency converter through a communication port. The frequency converter includes a plurality of output ports that respectively correspond to power frequencies of the fire pump main motor, the foam pump motor of the integrated foam pump, and a motor of the auxiliary gas supply device. The central control display screen is configured to output a control result. The alarm module and the auxiliary air compressor switch module are triggered by an output command of the foam mixing proportion single-chip microcomputer control system, and the power module is configured to supply power to the entire system.

Preferably, the foam generating device includes a variable cross section foam generating tube, a negative pressure current collector, a mixture injector, and a mixture buck elbow. The mixture buck elbow is threaded to the mixture injector. A tail part of the mixture injector is designed with a flange plate, and the flange plate may be fixed at a tail part of the negative pressure current collector through a bolt. In this case, an injector head of the mixture injector is buried in a working chamber of the negative pressure current collector. An upper part of the negative pressure current collector has an inlet pipe with left and right symmetrical air inlet ends, and the inlet pipe is configured to connect to the auxiliary gas supply device in the supply kit. The negative pressure current collector is fixedly connected to the variable cross section foam generating tube, and a fluid outlet end of the variable cross section foam generating tube is connected to the fire monitor interface.

Preferably, a middle narrow mouth of the variable cross section foam generating tube is provided with a fine mesh grid plate, welded inside the variable cross section foam generating tube, to increase the foam foaming expansion and make the foam foaming more even.

Preferably, the fluid mixing device adopts three-dimensional right-angle three-way modeling. When the fire-fighting water flow flows through a main passage of the fluid mixing device, the pressure of the fire-fighting water flow decreases in a radius direction of a flow area under the action of the elbow, and in this case, the foam liquid pressurized by the foam pump is injected into the main passage by a mixing tube in a radius direction of the interface of the main passage, and the foam liquid is rapidly diffused into the fire-fighting water flow due to a decompression effect, thus implementing full mixing of the two working mediums.

Preferably, the auxiliary gas supply device also adopts the form of a motor-driven air compressor to meet the high-pressure gas supply requirements. The motor in the auxiliary gas supply device, the fire pump main motor, and the foam pump motor in the integrated foam pump are all controlled by the control kit. The control kit is equipped with an adjustable control program that adjusts parameters according to a fuzzy control policy. The control kit changes the pressure and flow of the working medium provided by each device by adjusting the speed of the motor, and further changes the flow and form of the fire-fighting foam provided by the system, thus implementing the automatic control and intelligent operation required by the invention.

Preferably, the pipeline kit is configured to connect the supply kit to the mixing kit and implement the transmission of the working medium. The pipeline kit includes a fire hose, a foam liquid pipe, an air drainage tube, and a pipeline valve. The fire hose is a threaded pipe, and is threaded between a water outlet of the fire pump and the fire water flow pressure monitoring instrument and between the fire water flow pressure monitoring instrument and the fluid mixing device, and a fire-fighting water pipeline valve is disposed on the pipeline between the fire water flow pressure monitoring instrument and the fluid mixing device. The valve is a manual ball valve and plays the role of opening and closing the pipeline. The foam liquid pipe is a threaded pipe, and is threaded between the integrated foam pump and the foam liquid flow pressure monitoring instrument and between the foam liquid flow pressure monitoring instrument and the fluid mixing device, and a foam liquid pipeline valve is disposed on the pipeline between the foam liquid flow pressure monitoring instrument and the fluid mixing device. The valve is a manual ball valve and plays the role of opening and closing the pipeline.

Preferably, the air drainage tube plays the role of introducing air into the foam generating device and improving the foam foaming expansion and fire extinguishing efficiency. The air drainage tube includes a high pressure air drainage tube and an atmospheric pressure air drainage tub. The high pressure air drainage tube is a threaded pipe, and is threaded between a left entry of the air inlet end of the negative pressure current collector and the auxiliary air flow pressure monitoring instrument and between the auxiliary air flow pressure monitoring instrument and the auxiliary gas supply device, and a pipeline valve of the high pressure air drainage tube is disposed between the left entry of the air inlet end of the negative pressure current collector and the auxiliary air flow pressure monitoring instrument. The atmospheric pressure air drainage tube is a threaded pipe, and is threaded to a right entry of the air inlet end of the negative pressure current collector. The other end is not connected to other devices and is a straight-through tube, and a pipeline valve of the atmospheric pressure air drainage tube is disposed between the right entry of the air inlet end of the negative pressure current collector and an end of the atmospheric pressure air drainage tube. The high pressure air drainage tube is a connecting pipe between the auxiliary gas supply device and the foam generating device that is temporarily used under special requirements, and the atmospheric pressure air drainage tube is a drainage tube that is commonly used in work.

The beneficial effects are as follows: For the problems of flow fluctuation and low foam foaming efficiency of the vehicle-mounted foam fire-fighting equipment, the present invention optimizes the design and adopts a new control policy for control of the fluid flow proportion, thereby implementing precise mixing under the large flow condition. The design effectively avoids the problem of low foam foaming efficiency, and reduces the complexity of the system. The rational use of the energy of the high-pressure water jet makes the energy consumption lower and the operation steps of the system simpler. Further, on a platform such as a fire truck where flexibility is emphasized and power and volume are limited, the system can respond quickly and act accurately, thereby meeting the requirements of fire extinguishing operations, conforming to the development direction of intelligence and energy saving, and playing a certain guiding role for future design. In addition, under this design, the piping system layout is reasonable and the aesthetics is improved.

Figure 1:
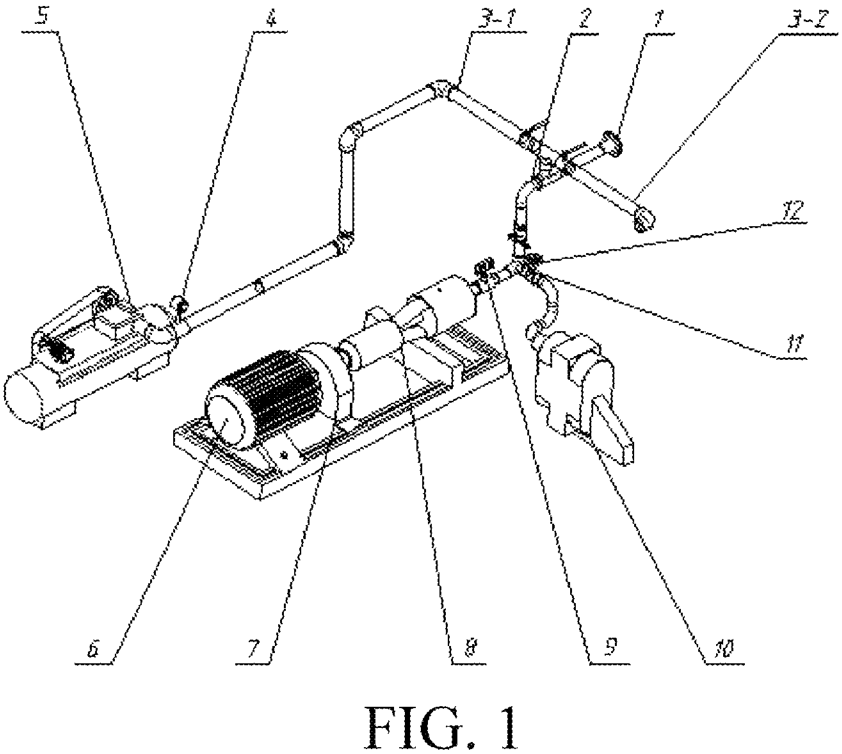
FIG. 1 is a schematic structural diagram of a mechanical part according to the present invention.
Figure 2:
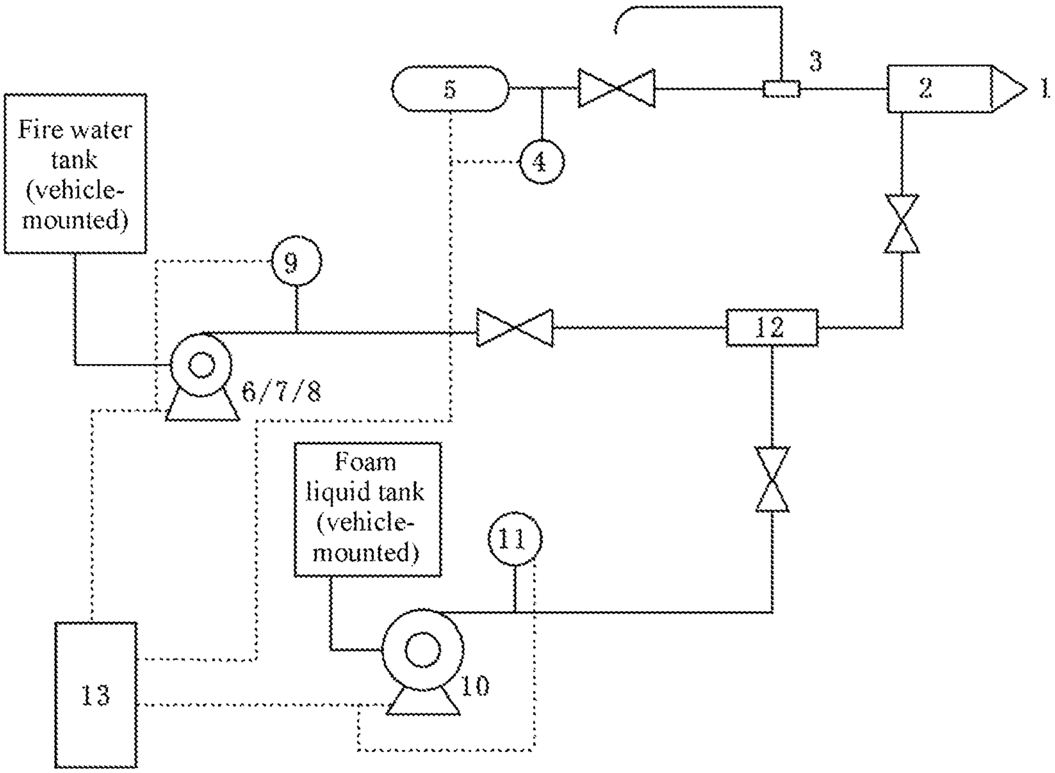
FIG. 2 is a piping diagram of the mechanical part according to the present invention.
Figure 3:
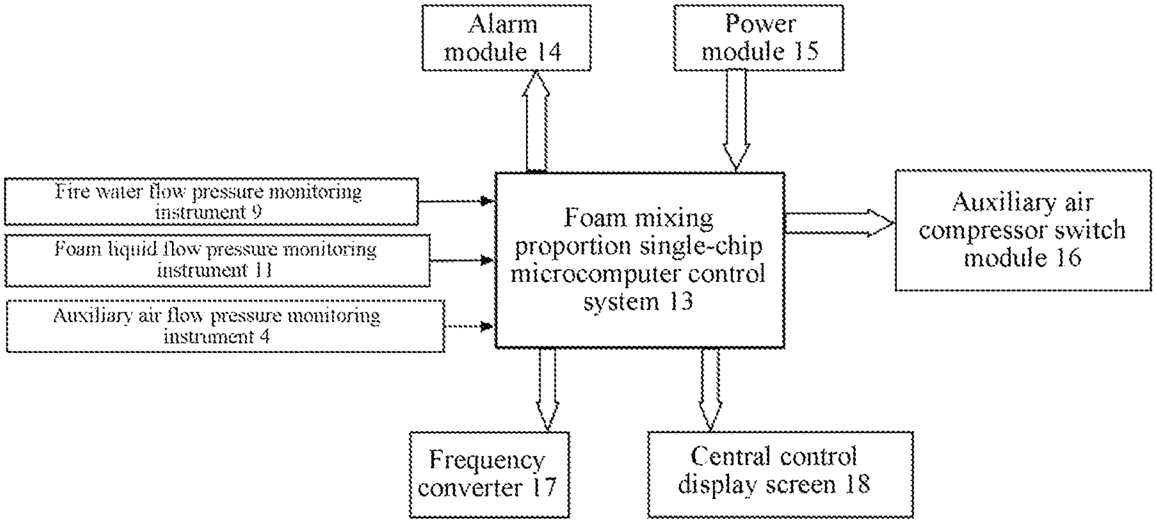
FIG. 3 is a schematic structural diagram of a control kit according to the present invention.

In the figures, 1—fire monitor interface; 2—foam generating device; 2-1—variable cross section foam generating tube; 2-2—negative pressure current collector; 2-3—mixture injector; 2-4—mixture buck elbow; 3—air drainage tube; 3-1—high pressure air drainage tube; 3-2—atmospheric pressure air drainage tube; 4—auxiliary air flow pressure monitoring instrument; 5—auxiliary gas supply device; 6—fire pump main motor; 7—coupling; 8—fire pump; 9—fire water flow pressure monitoring instrument; 10—integrated foam pump; 11—foam liquid flow pressure monitoring instrument; 12—fluid mixing device; 13—foam mixing proportion single-chip microcomputer control system; 14—alarm module; 15—power module; 16—auxiliary air compressor switch module; 17—frequency converter; 18—central control display screen.

DETAILED DESCRIPTION

The present invention will be described in detail below with reference to the accompanying drawings.

As shown in FIG. 1 to FIG. 4, a vehicle-mounted large-flow fire-fighting foam fluid mixing system provided in this embodiment includes a supply kit, a mixing kit, a control kit, and a pipeline kit.

The mixing kit includes a fire monitor interface 1, a foam generating device 2, and a fluid mixing device 12. The supply kit includes an auxiliary gas supply device 5, a fire pump main motor 6, a coupling 7, a fire pump 8, and an integrated foam pump 10.

The foam generating device 2 includes a variable cross section foam generating tube 2-1, a negative pressure current collector 2-2, a mixture injector 2-3, and a mixture buck elbow 2-4. The fluid mixing device 12 is connected to the mixture buck elbow 2-4. The mixture buck elbow 2-4 is threaded to the mixture injector 2-3, a tail part of the mixture injector 2-3 is designed with a flange plate, and the flange plate may be fixed at a tail part of the negative pressure current collector 2-2 through a bolt. In this case, an injector head of the mixture injector 2-3 is buried in a working chamber of the negative pressure current collector 2-2. An upper part of the negative pressure current collector 2-2 has an inlet pipe with left and right symmetrical air inlet ends, and the inlet pipe is configured to connect to the air drainage tube 3. The negative pressure current collector 2-2 is fixedly connected to the variable cross section foam generating tube 2-1. A middle narrow mouth of the variable cross section foam generating tube 2-1 is provided with a fine mesh grid plate, welded inside the variable cross section foam generating tube 2-1. The variable cross section foam generating tube 2-1 is fixedly connected to the fire monitor interface 1 through a flange.

The fire pump main motor 6 is connected to the fire pump 8 through the coupling 7, and provides rotating momentum to the fire pump 8. The fire pump 8 and the integrated foam pump 10 are respectively connected to the fluid mixing device 12. The integrated foam pump 10 includes two parts: a foam liquid power source and a pump group, and foam liquid is injected into water flow at a certain pressure at a place where pressure is lowered in a fire water elbow through the device to complete mixing of the two types of liquid. A fixing system of the auxiliary gas supply device 5, the fire pump 8, and the integrated foam pump 10 is fastened to a chassis of a fire truck through a bolt.

The pipeline kit includes an air drainage tube 3, a fire hose, a foam liquid pipe, and a pipeline valve. The fire hose is a threaded pipe, and is threaded between a water outlet of the fire pump 8 and the fire water flow pressure monitoring instrument 9 and between the fire water flow pressure monitoring instrument 9 and the fluid mixing device 12, and a fire-fighting water pipeline valve is disposed on the pipeline between the fire water flow pressure monitoring instrument 9 and the fluid mixing device 12. The foam liquid pipe is a threaded pipe, and is threaded between the integrated foam pump 10 and the foam liquid flow pressure monitoring instrument 11 and between the foam liquid flow pressure monitoring instrument 11 and the fluid mixing device 12, and a foam liquid pipeline valve is disposed on the pipeline between the foam liquid flow pressure monitoring instrument 11 and the fluid mixing device 12.

An auxiliary air flow pressure monitoring instrument 4 is disposed between the auxiliary gas supply device 5 and the air drainage tube 3. The air drainage tube 3 includes a high pressure air drainage tube 3-1 and an atmospheric pressure air drainage tube 3-2. Two ends of the high pressure air drainage tube 3-1 are respectively connected to the foam generating device 2 and the auxiliary gas supply device 5. The atmospheric pressure air drainage tube 3-2 is connected to the auxiliary gas supply device. The air drainage tube 3 is configured to introduce air into the foam generating device 2, to improve foaming efficiency. The atmospheric pressure air drainage tube 3-2 is a common working pipe, and is configured to directly introduce air in the atmosphere into the generating device to complete the foaming work. The high pressure air drainage tube 3-1 is a connecting pipe between the auxiliary gas supply device and the foam generating device that is temporarily used under special requirements.

The control kit includes an auxiliary air flow pressure monitoring instrument 4, a fire water flow pressure monitoring instrument 9, a foam liquid flow pressure monitoring instrument 11, a foam mixing proportion single-chip microcomputer control system 13, a alarm module 14, a power module 15, an auxiliary air compressor switch module 16, a frequency converter 17, and a central control display screen 18. Data interfaces of the auxiliary air flow pressure monitoring instrument 4, the fire water flow pressure monitoring instrument 9, the foam liquid flow pressure monitoring instrument 11, the alarm module 14, the auxiliary air compressor switch module 16, the frequency converter 17, and the central control display screen 18 are connected to a communication module of the foam mixing proportion single-chip microcomputer control system 13, and the power module 15 is connected to a power supply port of the foam mixing proportion single-chip microcomputer control system 13. The frequency converter 17 includes a plurality of output ports that respectively correspond to power frequencies of the fire pump main motor 6, a motor of the integrated foam pump 10, and a motor of the auxiliary gas supply device 5. The foam mixing proportion single-chip microcomputer control system 13 is provided with a data acquisition module, and the data acquisition module is connected to the fire water flow pressure monitoring instrument 9, the foam liquid flow pressure monitoring instrument 11, and the auxiliary air flow pressure monitoring instrument 4 respectively. The fire water flow pressure monitoring instrument 9 is disposed between the fire pump 8 and the fluid mixing device 12, and the foam liquid flow pressure monitoring instrument 11 is disposed between the integrated foam pump 10 and the fluid mixing device 12.

According to the above mechanical structure and control scheme of the vehicle-mounted large-flow fire-fighting foam fluid mixing system, the implementation includes the following steps.

(a) The fixing system of the auxiliary gas supply device 5, the fire pump 8, and the integrated foam pump 10 is first fastened to the chassis of the fire truck through a bolt. The distribution may be appropriately adjusted according to the relationship between the chassis and the equipment.

(b) The auxiliary air flow pressure monitoring instrument 4 is then connected between the air drainage tube 3 and the auxiliary gas supply device 5 through a flange system. It is noted that a cut-off valve may be disposed on the connecting pipe, and the valve should be fixed between the auxiliary air flow pressure monitoring instrument 4 and the air drainage tube 3.

(c) The fire water flow pressure monitoring instrument 9 is then connected between the fire pump 8 and the fluid mixing device 12 through a flange system. It is noted that a cut-off valve may be disposed on the connecting pipe, and the valve should be fixed between the fire water flow pressure monitoring instrument 8 and the fluid mixing device 12.

(d) The foam liquid flow pressure monitoring instrument 11 is then connected between the fluid mixing device 12 and the integrated foam pump 10 through a flange system. It is noted that a cut-off valve may be disposed on the connecting pipe, and the valve should be fixed between the foam liquid flow pressure monitoring instrument 11 and the fluid mixing device 12.

Figure 4:
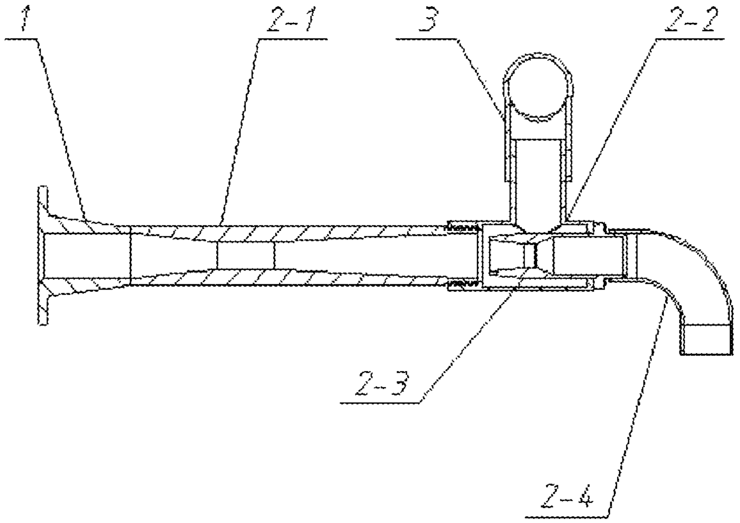
FIG. 4 is a sectional view of a mixing kit according to the present invention.
Figure 5:
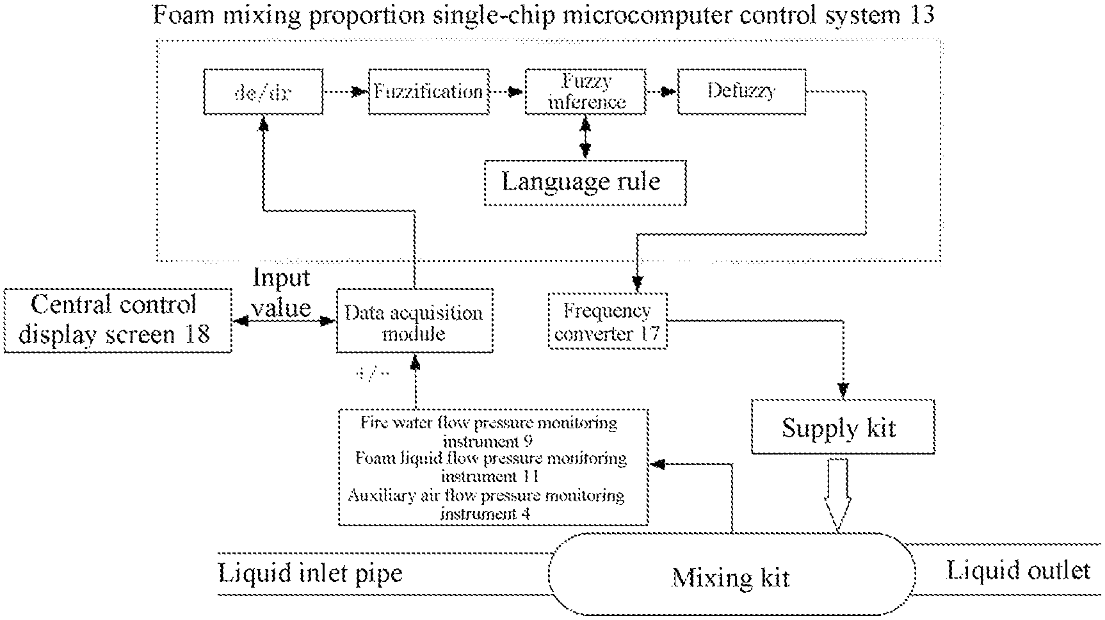
FIG. 5 is a schematic diagram of a working principle according to the present invention.

(e) According to the form in FIG. 4, the mixture buck elbow 2-4 is threaded to the tail end of the mixture injector 2-3, and the two are fixed to the tail end of the negative pressure current collector 2-2 through a flange device at the tail end of the mixture injector 2-3. A nozzle part of the mixture injector 2-3 is buried in the working chamber of the negative pressure current collector 2-2. The above whole is connected to the variable cross section foam generating tube 2-1 through the thread at the front end of the negative pressure current collector 2-2. The above whole is the foam generating device 2, and is connected to the fire monitor interface 1 through welding.

(f) According to the form in FIG. 1, the fluid mixing device 12 and the foam generating device 2 are connected to the mixture buck elbow 2-4 though a threaded pipe. In this case, attention should be paid to the matching of pipe threads to prevent leakage.

(g) According to the form in FIG. 1, the air drainage tube 3 is connected to the foam generating device 2 though a threaded pipe. It is noted that a cut-off valve may be disposed on the connecting pipe. In this case, the mechanical part is installed completely.

(h) Data interfaces of the frequency converter 17, the fire water flow pressure monitoring instrument 9, the foam liquid flow pressure monitoring instrument 11, the auxiliary air flow pressure monitoring instrument 4, the alarm module 14, the central control display screen 18, and the auxiliary air compressor switch module 16 are connected to a communication module of the foam mixing proportion single-chip microcomputer control system 13, and the power module 15 is connected to a power supply port of the foam mixing proportion single-chip microcomputer control system 13, to start the control system. After the initialization is completed, the vehicle-mounted large-flow fire-fighting foam fluid mixing system can implement the working requirements. Through the setting of the central control display screen 18, the system can automatically adjust control parameters, start the relevant pump group to supply liquid/gas, and maintain the stability of the system, to complete the work requirements.

The foregoing descriptions are merely preferred implementations of the present invention. It should be noted that a person of ordinary skill in the art may further make improvements without departing from the principle of the present invention, and these improvements should be considered as falling within the protection scope of the present invention.

What is claimed is:

1. A vehicle-mounted large-flow fire-fighting foam fluid mixing system, comprising a supply kit, a mixing kit, and a pipeline kit, wherein the supply kit is connected to the mixing kit by the pipeline kit;

the mixing kit comprises a fire monitor interface (1), a foam generating device (2), and a fluid mixing device (12), wherein a fluid inlet end of the foam generating device (2) is fixedly connected to the fluid mixing device (12), and a fluid outlet end of the foam generating device (2) is fixedly connected to the fire monitor interface (1);

the supply kit comprises an auxiliary gas supply device (5), a fire pump main motor (6), a fire pump (8), and an integrated foam pump (10), wherein the fire pump main motor (6) is connected to the fire pump (8) by the coupling (7); the fire pump (8) and the integrated foam pump (10) are respectively connected to the fluid mixing device (12); and the auxiliary gas supply device (5) is fixedly connected to the foam generating device (2);

wherein the vehicle-mounted large-flow fire-fighting foam fluid mixing system further comprises a control kit, wherein the control kit comprises an auxiliary air flow pressure monitoring instrument (4), a fire water flow pressure monitoring instrument (9), a foam liquid flow pressure monitoring instrument (11), a foam mixing proportion single-chip microcomputer control system (13), an alarm module (14), a power module (15), an auxiliary air compressor switch module (16), a frequency converter (17), and a central control display screen (18); and the fire water flow pressure monitoring instrument (9) is disposed between the fire pump (8) and the fluid mixing device (12), and the foam liquid flow pressure monitoring instrument (11) is disposed between the integrated foam pump (10) and the fluid mixing device (12);

the alarm module (14), the power module (15), the auxiliary air compressor switch module (16), the frequency converter (17), and the central control display screen (18) are respectively connected to the foam mixing proportion single-chip microcomputer control system (13); the foam mixing proportion single-chip microcomputer control system (13) is provided with a data acquisition module, the data acquisition module is connected to the fire water flow pressure monitoring instrument (9), the foam liquid flow pressure monitoring instrument (11), and the auxiliary air flow pressure monitoring instrument (4) respectively; and the frequency converter (17) includes a plurality of output ports that respectively correspond to power frequencies of the fire pump main motor (6), a motor of the integrated foam pump (10), and a motor of the auxiliary gas supply device (5).

2. The vehicle-mounted large-flow fire-fighting foam fluid mixing system according to claim 1, wherein the foam generating device (2) comprises a variable cross section foam generating tube (2-1), a negative pressure current collector (2-2), a mixture injector (2-3), and a mixture buck elbow (2-4) that are connected in sequence; a fluid outlet end of the variable cross section foam generating tube (2-1) is connected to the fire monitor interface (1); an injector head of the mixture injector (2-3) is buried in a working chamber of the negative pressure current collector (2-2); the fluid mixing device (12) is connected to the mixture buck elbow (2-4); and the auxiliary gas supply device (5) is connected to an inlet pipe at upper part of the negative pressure current collector (2-2).

3. The vehicle-mounted large-flow fire-fighting foam fluid mixing system according to claim 2, wherein a middle narrow mouth of the variable cross section foam generating tube (2-1) is provided with a fine mesh grid plate.

4. The vehicle-mounted large-flow fire-fighting foam fluid mixing system according to claim 2, wherein the pipeline kit comprises an air drainage tube (3); the air drainage tube (3) comprises a high pressure air drainage tube (3-1) and an atmospheric pressure air drainage tube (3-2); the high pressure air drainage tube (3-1) is connected between a left entry of an air inlet end of the negative pressure current collector (2-2) and the auxiliary air flow pressure monitoring instrument (4) and between the auxiliary air flow pressure monitoring instrument (4) and the auxiliary gas supply device (5); and the atmospheric pressure air drainage tube (3-2) is connected to a right entry of the air inlet end of the negative pressure current collector (2-2).

5. The vehicle-mounted large-flow fire-fighting foam fluid mixing system according to claim 2, wherein the pipeline kit comprises a plurality of pipeline valves; a pipeline between the fire water flow pressure monitoring instrument (9) and the fluid mixing device (12) is provided with a pipeline valve; a pipeline between the foam liquid flow pressure monitoring instrument (11) and the fluid mixing device (12) is provided with a pipeline valve; and a pipeline valve is disposed between the right entry of the air inlet end of the negative pressure current collector (2-2) and an end of the atmospheric pressure air drainage tube (3-2), and a pipeline valve is disposed between the left entry of the air inlet end of the negative pressure current collector (2-2) and the auxiliary air flow pressure monitoring instrument (4).

6. The vehicle-mounted large-flow fire-fighting foam fluid mixing system according to claim 1, wherein the fluid mixing device (12) is modeled in a three-dimensional right-angle three-way form.

* * * * *